_(12)_ United States Patent
Maturana et al.

(10) Patent No.: US 6,931,289 B2
(45) Date of Patent: Aug. 16, 2005

(54) LANGUAGE STRUCTURE FOR AUTONOMOUS COOPERATIVE CONTROL SYSTEM

(75) Inventors: Francisco Paul Maturana, Twinsburg, OH (US); Sivaram Balasubramanian, Solon, OH (US); Raymond John Staron, Richmond Heights, OH (US); Pavel Tichy, Nymburk (CZ); Petr Slechta, Ceska Lipa (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 518 days.

(21) Appl. No.: 10/242,597

(22) Filed: Sep. 12, 2002

(65) Prior Publication Data

US 2003/0078678 A1 Apr. 24, 2003

Related U.S. Application Data

(60) Provisional application No. 60/325,410, filed on Sep. 27, 2001.

(51) Int. Cl.$^7$ .............................................. G05B 19/42
(52) U.S. Cl. ............................. 700/86; 700/87; 700/88; 700/89; 700/18; 714/38; 717/115; 717/138
(58) Field of Search .............................. 700/86, 87, 88, 700/89, 18; 717/115, 139

(56) References Cited

U.S. PATENT DOCUMENTS 5,845,258 A  *  12/1998  Kennedy ........................ 705/8
6,091,998 A  *   7/2000  Vasko et al. ................. 700/100
6,094,955 A  *   8/2000  Vasko et al. ................... 72/7.2
6,272,391 B1 *   8/2001  Maturana et al. ............ 700/103
6,424,872 B1 *   7/2002  Glanzer et al. ............... 700/18
6,427,221 B1 *   7/2002  Maturana et al. ............ 714/798
6,430,454 B1 *   8/2002  Vasko et al. ................. 700/100
6,459,944 B1 *  10/2002  Maturana et al. ........... 700/100
6,580,967 B2 *   6/2003  Jevtic et al. ................. 700/228
6,647,300 B1 *  11/2003  Balasubramanian et al. ... 700/4
6,687,834 B1 *   2/2004  Morales et al. ............. 713/201

* cited by examiner

Primary Examiner—Anthony Knight
Assistant Examiner—Thomas Pham
(74) Attorney, Agent, or Firm—Quarles & Brady, LLP; R. Scott Speroff

(57) ABSTRACT

In an autonomous cooperative control system a job description of job steps is drafted in a scripting language and compared to corresponding machine steps associated with each independently controlled machine also drafted in the same scripting language for simple comparison and generation of sub-bids for further bidding. The machine steps generated for each ACU provides a vocabulary for the job description language which may be further simplified by hiding lower level machine steps in the ACUs to be activated only upon a matching with a job step. The ACUs may select between connected and unconnected messaging based on historical communication patterns to reduce network traffic.

20 Claims, 4 Drawing Sheets

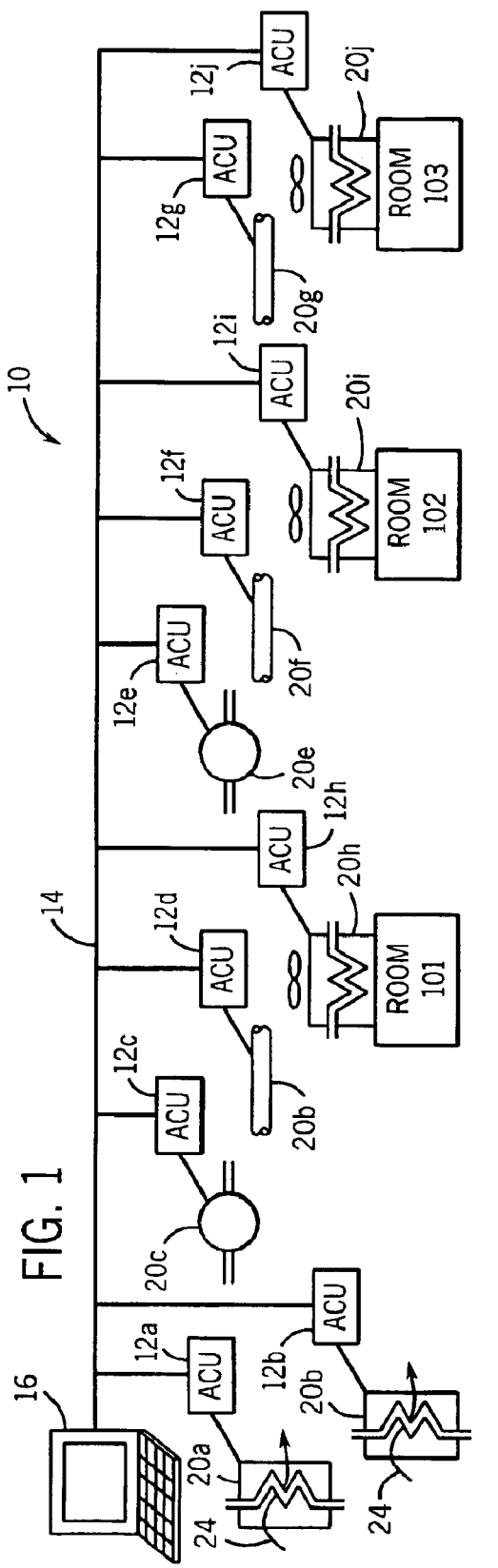
FIG. 1
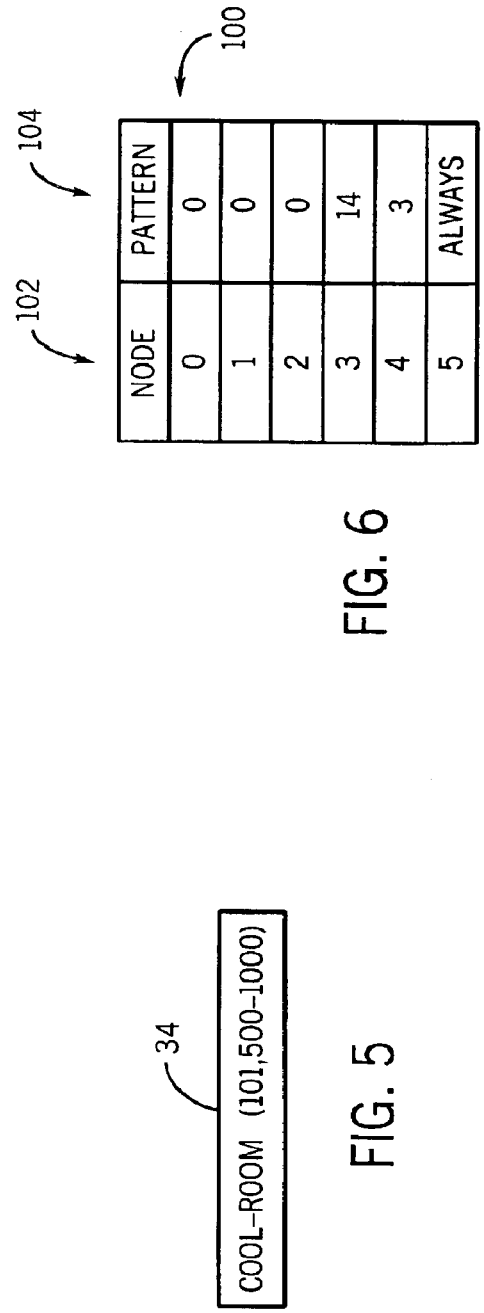
FIG. 6
FIG. 5

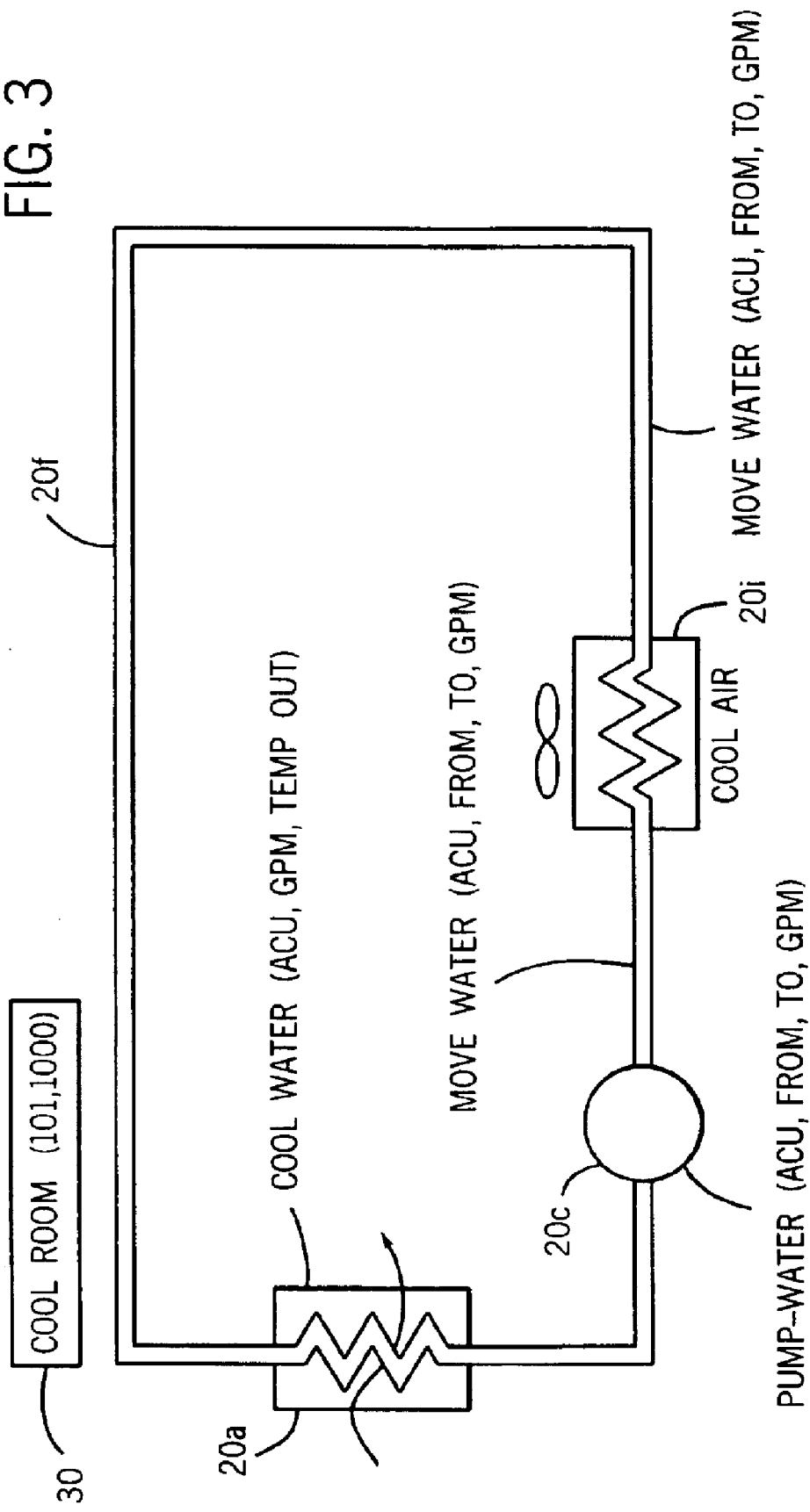

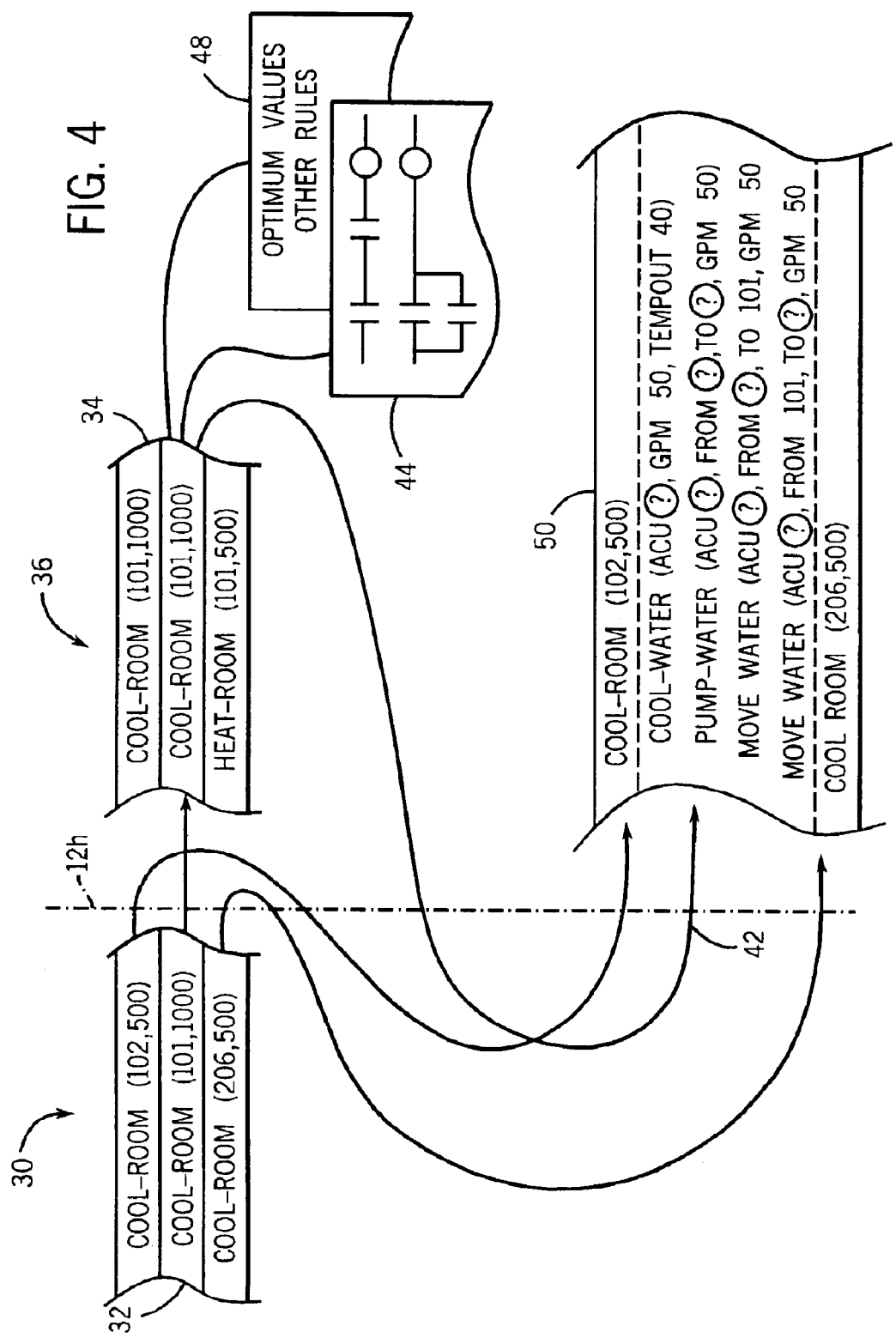

LANGUAGE STRUCTURE FOR AUTONOMOUS COOPERATIVE CONTROL SYSTEM

CROSS-REFERENCE TO RELATED APPLICATIONS

This case is based on provisional application No. 60/325,410 filed Sep. 27, 2001, and claims the benefit thereof.

STATEMENT REGARDING FEDERALLY SPONSORED RESEARCH OR DEVELOPMENT

BACKGROUND OF THE INVENTION

The present invention relates to industrial control systems and the like, and in particular, to an industrial control system that may divide tasks among multiple machines or components using "market" model employing bids and counter bids.

A variety of commercial and industrial processes may be automated using an industrial controller. Generally, such a controller is a specialized computer providing input/output (I/O) circuitry attached respectively to sensors and actuators on the machines and components. The industrial controller executes a control program to read inputs from sensors on the machines implementing the process, and based on the values of those inputs and control logic of the control program, produces outputs to actuators to control the process. Industrial controllers are frequently modular in construction, so that the number of input and output circuits, and the processor power may be tailored to the demands of the particular process.

A significant cost in automating a process with an industrial controller is the cost of preparing the control program. The same variation in processes that drives the need for the controller architecture to be flexible normally requires a control program to be written specifically for or extensively modified for the process. This development of the control program can be prohibitively expensive for complex processes.

The problems related to developing control programs have spurred investigation of systems of autonomous cooperative units (ACU). Each ACU operates with knowledge of the capabilities of an associated machine or component of the process and according to a set of general rules which incorporate a market model, and a general description of control problem, bid and counter bid to solve the control problem. Effectively, the ACUs write their own program, and the ease with which they program themselves allows the ACUs to reprogram themselves freely to accommodate changes in the control problem including loss of particular ACUs and/or equipment.

Pending U.S. Pat. Nos. 6,091,998 issued Jul. 18, 2000, and 6,272,391 issued Aug. 7, 2001, assigned to the assignee of the present invention, and hereby incorporated by reference, describe such systems of ACUs in the context of a rolling mill in which various components of the mill including furnaces, a rolling mill, cooling devices, cooperatively allocate jobs among themselves based on a job description. Such autonomous control is, however, applicable to a wide variety of situations in which machine elements of the process must organize themselves.

This breadth of possible applications of systems of ACUs presents a problem in creating the general job description that the ACUs use as a framework about which to organize their efforts. As described in the previously referenced applications, such a job description may be written in a job description language (JDL) parsed according to specific rules by the ACUs. To the extent that the JDL and parsers must be designed afresh for each application, some of the advantages of an ACU system over a controller using a conventional custom written control program may be lost.

BRIEF SUMMARY OF THE INVENTION

The present invention provides a job description language (JDL) that shares the same scripting language used by elements of an index describing the capabilities of the ACUs and internal to the ACUs. This symmetry allows each ACU to parse the JDL simply by comparing its script language elements to the script language elements of the JDL simplifying the parsing process.

Sub-bids by a particular ACU (in JDL form) may be generated simply by "tearing off" portions of the JDL not matching the capabilities of the receiving ACU and communicating these portions, possibly augmented by other needed capabilities, downstream to other ACUs.

When an ACU receives a request message, it searches for a template associated with the request, which is expressed as an ACU capability. A template is a description of the steps to solve an incoming request; it is also a work description. The template is instantiated and the ACU examines the template instance. If a step is local (can be solved by the ACU and its equipment-machine steps), it is solved locally. If a step is global (cannot be solved by the ACU), it is converted into another request message to be sent to other agents that have the <Capability Operation>combination.

More generally, the capabilities of each machine associated with an ACU, as captured in the script language, form a vocabulary for the JDL. The task of generating the JDL is thus greatly simplified. The JDL may be selected from a subset of instructions which are specified in the script as action steps. The remaining instructions are circulated solely and invisibly among the ACUs, thus further simplifying the creation of a job description in the JDL.

Specifically then, the present invention provides a method of operating a control system to implement, using a plurality of machines, a job described by a job description, where each machine is associated with an autonomous cooperative unit (ACU). The ACUs, responding to the job description and/or bids and counter bids from other autonomous control systems, coordinate the operation of the machines to perform the job. The method includes the steps of formulating the job description as a set of job steps in a scripting language and associating with each machine a set of machine steps also in the scripting language. At the ACUs, job steps of the job description language are allocated to each machine by identifying those scripting language job steps that match the scripting language machine steps in the ACU.

Thus, it is one object of the invention to provide a simple method of interpreting the job description. By using a common scripting language for both the job description 30 and the capability index 36 held by the ACUs 12, parsing becomes a simple matter.

It is another object of the invention to provide a simple method of generating a vocabulary for the job description language. By reviewing the capability indices of each ACU, all possible job steps are readily defined.

At each given ACU in which at least one job step matches a machine step, the ACU may further transmit to other ACUs the job description with the matching job step removed.

Thus, it is another object of the invention to provide a simple method of generating sub-bids in the autonomous control system. Those job steps of the job description that cannot be performed by the given ACU naturally become the ACUs sub-bid by simply "tearing off" the matching job steps.

The job steps and machine steps describe operations and are associated with operation parameters that modify the operation. In this case, the ACUs may associate with each machine a plurality of machine steps describing the same operation but with different operation parameters, and a given ACU may only identify for performance job steps that directly match both the operation and operation parameter of the machine steps in the ACU.

Thus, it is another object of the invention to provide for "firing conditions" that allow an ACU with a particular capability needed in the job description to further parse that job step according to additional parameters required in the operation.

The operation parameters may be described as a range and the ACU may identify only job steps that directly match the operation of the machine steps and which have operation parameters in the range of the machine steps.

Thus, it is another object of the invention to provide flexibility in the parsing that allows flexible grouping of particular capabilities.

The machine steps may be associated with programs for controlling the associated machine to implement the machine steps on the associated machine.

Thus, it is another object of the invention to provide a simple linkage between an arbitrary control language (e.g. relay ladder language) and the scripting language elements.

At least one machine step may be associated with additional job steps and the process may include, for a given ACU at which at least one job step matches a machine step associated with addition job steps, further transmitting from the given ACU to other ACUs the job description with the matching job step removed and the additional job steps added.

Thus, it is another object of the invention to allow low level scripting language elements transmitted only between ACUs and hidden from the job description that a programmer must write. The basic script language is a form of the extensible markup language, or XML. XML is one possibility for encoding JDL, but other approaches such as binary encoding can also be used.

Thus, it is another object of the invention to make use of the extensive program support available for the XML scripting language.

These particular objects and advantages may apply to only some embodiments falling within the claims and thus do not define the scope of the invention.

BRIEF DESCRIPTION OF THE DRAWINGS

FIG. 1 is a schematic representation of the components of an air-conditioning system, each associated with intercommunicating ACUs for automatically configuring the components for the cooling of one or more of several rooms;

FIG. 3 is a representation of an organization of the components of FIG. 1 per the job description showing sub-bids required by an air cooler receiving that job description;

FIG. 4 is a figure similar to that of FIG. 2 showing the job description and capability index populated with script elements for the application of FIG. 1;

FIG. 5 is an example index element having a range of operating parameters; and

FIG. 6 is a table used to select between connected and unconnected messages in the communication initiated by an ACU.

DETAILED DESCRIPTION OF THE PREFERRED EMBODIMENT

Figure 2:
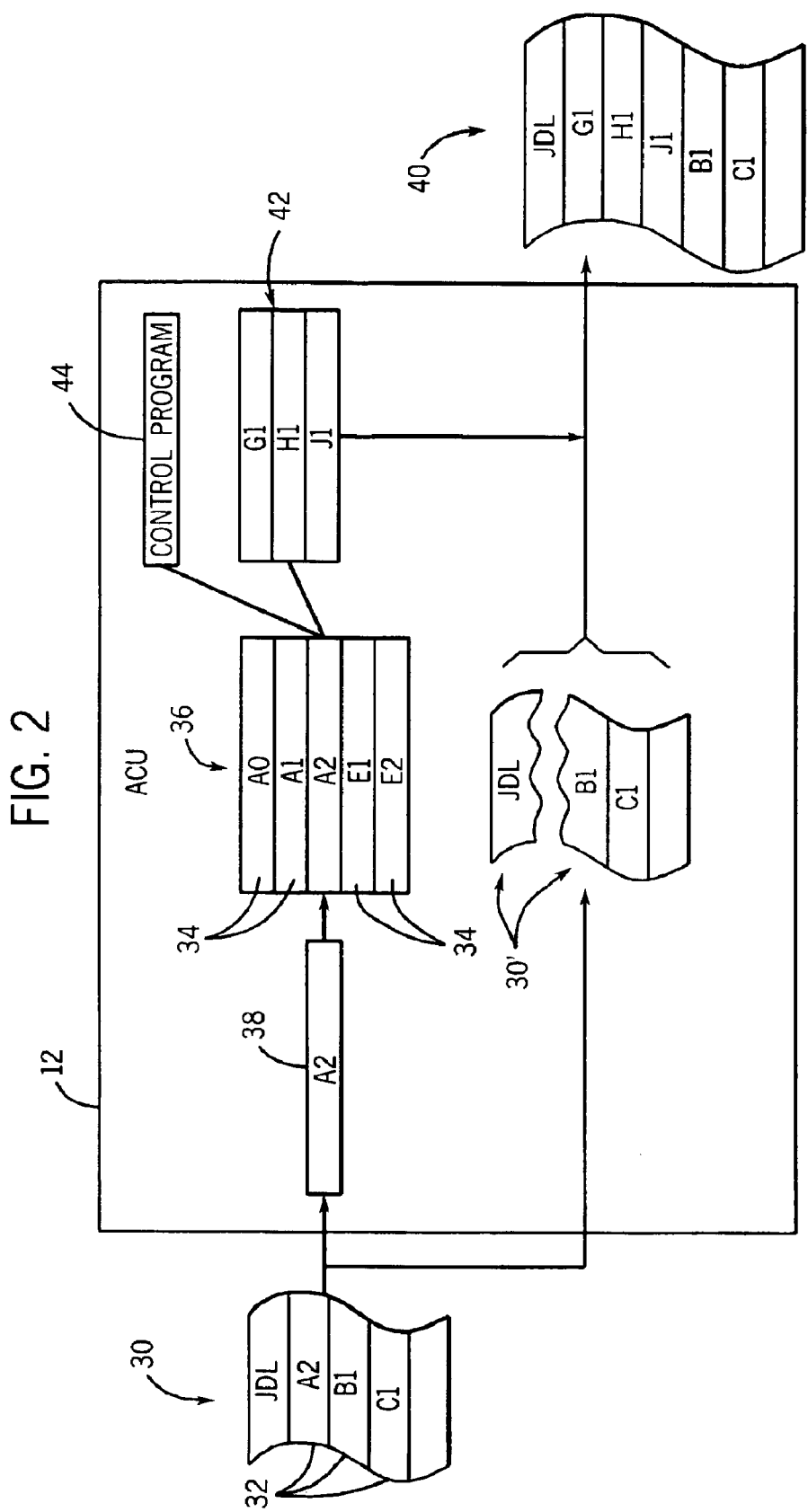
FIG. 2 is a flow diagram showing the receipt of a job description language (JDL) message defining a job of cooling of the rooms by an ACU associated air cooler of a room showing a capability index having "machine step" scripting language elements matching the "job step" scripting language elements of the JDL, and showing an association between "machine steps" and control programs and other job steps and data and showing the generation of a sub-bid by the ACU.

Referring now to FIG. 1, a control system 10 providing air conditioning may employ a variety of separate autonomous cooperative units 12a–12j attached to a common network 14. Also attached to the network 14 is a terminal 16 allowing the downloading of programs to the autonomous cooperative units 12a–12j and an inputting of a job description as will be described below. The ACUs 12a–12j may also include an operating system supporting interpretation of a standard agent language to facilitate the bidding process between ACUs 12 via the network 14.

The communications over the network 14 may be "connected" or "unconnected". As is understood in the art, connected messages are those which are identified to a pre-established connection between one or more ACUs in which scheduling and buffering of data has been predefined and allocated so as to provide greater certainty that the connected message will be timely transmitted and received. The ACUs 12 will split their communications between connected and unconnected messages as will be described below.

Generally, the ACUs 12a–12j share some characteristics of conventional industrial controllers, providing I/O circuits to communicate with an associated machine 20a–20j. In the example of FIG. 1, ACUs 12a and 12b are associated with water chillers 20a and 20b; ACUs 12c and 12d are associated with pumps 20c and 20e; ACUs 12d, 12f and 12g are associated with pipes 20d, 20f and 20g; and ACUs 12h, 12i and 12j are associated with room coolers 20h, 20i and 20j, respectively.

The water chillers 20a and 20b provide an inlet pipe for receiving water and running it through a heat exchanger communicating with a cooling stream 24 to cool the water upon exit from an outlet pipe. The operating parameters for this cooling are flow rate through the pipe, the inlet temperature, the temperature of the cooling stream and the outlet temperature. Generally, the ACUs 12a and 12b associated with water chillers 20a and 20b control the outlet temperature as a function of flow rate of the water.

The pumps 20c and 20e provide a pumping action from an inlet pipe to an outlet pipe and have, as an operating parameter, a flow rate. The ACUs 12c and 12e associated with pumps 20c and 20e control the operating parameter of flow rate of the water through the pump.

Pipes 20d and 20f have a point of origin and a destination which may be controllable by incorporation of valves into the logical entity of the pipe. In this case the ACUs 12d, 12f and 12g control origin and destination of the pipes. The pipes also have an intrinsic flow rate parameter.

The room coolers 20h, 20i and 20j accept a cooling stream of water into a heat exchanger having a cross current of air from a fan that may be blown into the rooms 101, 102, or 103. The room coolers 20*h*, 20*i* and 20*j* have as their operating parameters fan speed, water flow rate, and water temperature.

To operate, each room cooler 20*h*, 20*i* or 20*j* must be associated with a pump 20*c* or 20*e*, water chillers 20*a* or 20*b*, and a supply and return pipe 20*d*, 20*f* or 20*g*, and the ACUs 12 negotiate to provide a dynamic reconfiguration of these components so as to share them among the particular rooms on a demand basis. The job description can be as simple as the specification of a cooling amount (e.g., 1000 BTU/hour) of a particular room (e.g., 101). The job description will provoke bidding among the ACUs 12 to configure the necessary elements 20 to produce the desired cooling.

Referring also to FIG. 2, a job description 30 in a job description language (JDL) may be input from the terminal 16 to the ACUs 12 at the beginning of the process, the job description including a number of job steps 32 drafted in a scripting language meaning generally a language that will be interpreted by another program prior to execution. In a preferred embodiment of the invention, the syntax of the scripting language will follow that of the Extensible Markup Language (XML) so that XML parsers and other available software may be used.

A given ACU 12 receiving the job description 30 matches the job steps 32 against machine steps 34 in a capability index 36 stored in the ACU. The machine steps 34 are drafted in the same scripting language as the job steps 32 of job description 30, preferably being a form of XML. Thus, the parsing process needed to analyze the job description 30 can be reduced to a simple matching operation.

Each job step 32 and machine step 34 defines an operation to be performed, (A, B, C, etc), for example, cooling of a room. The machine steps 34 are linked to control programs 44 providing steps written in conventional industrial controller languages, such as function block language or relay ladder language, to affect the particular step and its operating parameters. The machine steps 34 are also linked to other supplemental job steps 42 that may need to be performed by other ACUs and additional data allowing for optimized performance.

The operations (A, B, C, etc) defined by the job steps 32 and the machine steps 34 may be further modified by operating parameters (0, 1, 2, etc.). Thus, for example, a pump 20 may be capable of pumping (its capability) at different flow rates (its operating parameters). The flow rates operating parameter may be a function of other operating parameters such as power consumed, water temperature, etc. Together a capability and an operating parameter make up a machine step 34.

Within the capability index 36, different machine steps 34 may have the same operation with different operating parameters for finer parsing of the job description 30 and a better matching of the desired job step 32 to a particular control program 44.

Referring generally to FIG. 1, before operation of the ACUs 12, the capability index 36 of each ACU 12 must be populated according to the particular machine 20 with which it is associated. Determining the necessary machine steps 34 for the capability index 36 requires evaluation of the capabilities of the machine element 20 and the operating parameters for those capabilities.

This process, though time consuming, need only be done once for each machine type, and thus is not properly counted against the time and effort needed to program a particular system. Normally, the process of completing the capability index 36 will be done only once for a particular machine element 20, and thereafter will be shared for all subsequent control systems using that machine element 20.

Referring again to FIG. 2, after the job description 30 has been received by an ACU 12, the job steps 32 of the job description 30 that match machine steps 34 of the capability index 36 form a matching set 38. This matching set 38 is removed from the remainder of the job description 30 which now indicates needed capabilities not available at the given ACU 12. The remainder of the job description 30 is then forwarded as sub-bid 40 from the given ACU 12 greatly simplifying the generation of sub-bids 40.

As mentioned, the machine steps 34 of the matching set 38 may also be linked in the capability index 36 with additional supplemental job steps 42 that are required to be performed by another ACU for the given ACU to complete the indicated machine step 34 of the matching set 38. That is, the given ACU 12 and its associated machine 20 can perform the particular machine step 34 with assistance from possibly other ACUs. These supplemental job steps 42 may be spliced into the sub-bid 40 before it is sent out. The ability to generate the supplemental job steps 42 eliminates the need for the programmer of the job descriptions 30 to have comprehensive understanding of the subprocesses needed to produce the desired job, knowledge of such subprocesses being delegated to the ACUs 12.

Referring now to FIG. 3, a specific job description 30 may, for example, require the cooling of a particular room (e.g., 101) by a particular amount (e.g., 1000 BTU/hours). This would be indicated by a job step 32 having the logical form of "cool-room (101,1000)". Clearly, this is a very superficial description of a job, yet as will be described, information contained in the ACUs 12 enables this description to suffice for organization of the ACUs. Generally, this job requires a water chiller (for example, 20*a*) to be connected to a pump (for example, 20*c*) to pump water to a room cooler (for example, 20*i*) to be discharged possibly back to the water chiller, through a pipe (such as 20*f*). Yet, neither the specific machine elements 20 nor the necessary operating parameters have been defined in the job description 30.

Importantly, the water chiller requires identification of a particular ACU 12*a* or 12*b* (and hence the particular water chiller 20*a* or 20*b*) and the operating parameters of flow rate (GPM) and outlet temperature. Likewise, the pump requires identification of an ACU 12*c* or 12*e*; a source to which the pump is connected (ideally the yet unspecified water chiller); the destination to which the pump is connected (for example, a yet unspecified pipe to the yet unspecified room cooler), and a flow rate which must ultimately match those of the water chiller. Finally, the water pipes must identify a source and destination and a flow rate they can support.

Referring now to FIGS. 3 and 4, this job description 30 having the job step 32 of "cool-room (101,1000)" is broadcast to the various ACUs 12. In this example, only air coolers 20*h*, 20*i*, and 20*j* (associated with ACUs 12*h*, 12*i* and 12*j*) have the capability of "cool room" in their capability indices 36 because they are associated with rooms and provide the desired output. Of these ACUs, only ACU 12*h* can match the operating parameter of the room number and hence ACU 12*h* becomes a lead bidder. Specifically, the capability index 36 of ACU 12*h* includes a machine step 34 of "cool-room 101,1000", precisely what is needed.

As indicated above, the capability index 36 of ACU 12*h* will also include other machine steps 34 not relevant to this job description 30. These other machine steps differ by the cooling amount (BTU/hour) reflecting different operating modes of the room cooler and allow these different operating conditions to be associated with different control programs 44. In cases where the single control program 44 is sufficiently flexible to handle a range of parameters, the machine step 34 may provide a range of operating parameters as shown in FIG. 5.

In this example, the ACU 12h can handle cooling of the desired room 101 but will need to sub-contract out the cooling of the water, the pumping of the water, and the moving of the water, and it does this through supplemental job steps 42. In this case, the supplemental job steps 42 include cooling the water, pumping the water, moving the water to the cooler and returning the water as was described with respect to FIG. 3. These supplemental job steps 42 are spliced into the remaining job steps 32 of the job description language and sent out as a sub-bid from the ACU 12h.

This sub-bid 50 may be sent to the other ACUs who may compare the job steps 32 of the sub-bid 50 to their own capability indices 36. Alternatively, in order to reduce network traffic, the sub-bid may be prequalified by a central index that identifies the capabilities of different ACUs.

The operating parameters of the supplemental job steps 42 may be inserted by the ACU 12h if known, or left open for bids by the various ACUs 12 responding to the sub-bid 50. Thus, for example, for the supplemental job steps 42 of cooling the water, no ACU number is specified, allowing either ACU 12a or 12b to respond. The ACU 12h does insert a flow rate and outlet temperature indicating its preferred value; however, these may be modified by counter bids. For the supplemental job steps 42 of moving the water, the ACU number and the destination are left wholly open by ACU 12h; however, the water must be moved to room 101, and a proposed flow rate is placed in the supplemental job steps 42 as an operating parameter as these are known by the ACU 12h. Likewise, with the supplemental job step 42 of "move water" (away from the room cooler), the ACU number and its destination are left open; however, the source of the water and the flow rate are placed in the bid by the ACU 12h. The operating parameters for the supplemental job steps 42 of moving water from the pump to the room cooler have only the destination completed by the ACU 12h.

Employing a process of bidding and counter bidding, as is described in copending applications and U.S. Pat. No. 6,091,998 issued Jul. 18, 2000, U.S. Pat. No. 6,272,391 filed Aug. 7, 2001, Ser. No. 09/407,474 filed Sep. 28, 1999, Ser. No. 09/407,604 filed Sep. 28, 1999, Ser. No. 09/627,984 filed Jul. 28, 2000, and Ser. No. 09/621,718 filed Jul. 24, 2000, hereby incorporated by reference, these supplemental job steps 42 are accepted by various ACUs 12 and the remaining operating parameters are filled in. Successful sets of bids employing various sets of ACUs are then evaluated by an ACU or supervisory program operating in the terminal 16.

The number of messages transmitted between the ACUs 12 in this process can become quite large for complex systems due to the parallel exploration of the job solution space. As described in the referenced co-pending applications, the number of messages can be reduced with directory structures that prequalify sub-bidders, for example.

More efficient use of network resource can also be obtained by judicious use of connected and unconnected messages. Generally, connected messages require additional network resource to establish the connection, but these additional resources can be justified for messages that benefit disproportionably from the greater reliability of connected messages or messages that are exchanged regularly between two ACUs where the burden of establishing the connection is spread over many messages reducing the need for retransmission.

Thus, the ACUs 12 generally may select between using a connected message and an unconnected message. This determination of which type of messaging to use may employ a variety of techniques including selection of message type according to the purpose of the message (e.g., negotiations are connected, sub-bids are unconnected) or by the parties to the communication (e.g., communications with a directory are connected, communications with an ACU 12 are unconnected) or by criticality of the message (e.g., acceptances are connected, bids are unconnected), Preferably, however, the ACUs 12 make this selection between connected and unconnected messaging based on a recognition of historical communication patterns, with repeated communications being assigned to connections only when the connection burden is justified. Referring to FIG. 6, in one embodiment, each ACU 12 may maintain a table of communication 100. The table of communication 100 lists different nodes 102 representing endpoints such as an ACU for communication as well as data 104 indicating whether the historical pattern of communication with this end node justifies connected messaging.

A simple pattern recognition system is to tally the average number of messages exchanged with each other node during a last predetermined number of bid cycles. A new bid cycle occurs after any disruption of the system that requires a new organization of the ACUs 12. Upon occurrence of a new bid cycle, existing connections are broken and the decision whether to reestablish connections for a particular node can be made based on the tally held in the table 100. Nodes with more than a predetermined number of average messages would have a connection opened. The table 100 also allows other rules to be implemented, for example, a rule that messages with a given node (e.g., a directory shown as node 5) are always connected based on a prior knowledge that directory messages are frequent. More sophisticated pattern analysis is also possible.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of operating a control system to implement, using a plurality of machines, a job described by a job description, where each machine is associated with an autonomous cooperative unit (ACU) responding to the job description and/or bids and counterbids from other ACUs so as to coordinate the operation of the machines to perform the job, the method comprising the steps of:

(a) formulating the job description as a set of job steps in a scripting language:

(b) associating with each machine a set of machine steps also in the scripting language; and (c) using the ACUs, allocating job steps of the job description to each machine by identifying job steps in the scripting language that match the machine steps in the scripting language.

2. The method of claim 1 wherein the script language uses the extensible markup language.

3. The method of claim 1 wherein the ACUs communicate using both connected and unconnected messages.

4. The control system of claim 3 further including step:

(d) for given ACU at which at least one job step matches a machine step, further transmitting from the given ACU to other ACU, the job description with the matching job step removed.

5. The control system of claim 3 wherein the job steps and machine steps describe operations and are associated with operation parameters that modify the operations and wherein:

step (b) associates with each machine a plurality of machine steps describing the same operation but with different operation parameters; and wherein step (c) only identifies job steps in the script language that directly match both the operations and operation parameters of the machine steps in the script language.

6. The control system of claim 3 wherein each of the machine steps is associated with a program for controlling the associated machine to implement the machine step on the associated machine.

7. The control system of claim 3 further wherein at least one given machine step is associated with additional job steps and wherein at step (c) when the given machine step is matched with a job step, the additional job steps are transmitted to other ACUs.

8. The method of claim 3 wherein the ACUs select between connected or unconnected messages based on historical patterns of communication between the ACUs.

9. The control system of claim 3 wherein the script language uses extensible markup language.

10. The method of claim 5 wherein the operation parameters of the machine steps are described as a range and wherein;

step (c) identifies job steps in the script language that directly match the operation of the machine steps in the script language and which have operation parameters within the range of the operation parameters of the machine steps.

11. The method of claim 7 wherein machine steps maybe associated with additional job steps and further including step (d) for a given ACU at which at least one job step matches a machine step associated with additional job steps, further transmitting from the given ACU to other ACUs, the job description with the matching job step removed and the addition job steps added.

12. In a control system implementing on a plurality of machines a job described by a job description, where each machine is associated with an autonomous cooperative unit (ACU) responding to the job description and/or bids and counterbids from other ACUs so as to coordinate the operation of the machine to perform the job, the improvement comprising:

(a) means for transmitting to a given ACU, a job request composed of a set of parameters and constraints to be satisfied by the remote ACU, ACUs use their internal job steps in a script language to satisfy requests (b) storage means associated with each machine for holding a set of machine steps in the script language; and (c) ACU matching means for identifying job steps in the script language that match the machine steps in the script language.

13. The control system of claim 12 further including:

(d) ACU transmitting means for further transmitting from the given ACU to other ACU, the job description with the matching job step removed when at least one job step matches a machine step.

14. The control system of claim 12 wherein the job steps and machine steps describe operations and are associated with operation parameters that modify the operations and wherein:

the storage means further associates with each machine a plurality of machine steps describing the same operation but with different operation parameters; and wherein the ACU matching means only identifies job steps in the script language that directly match both the operations and operation parameters of the machine steps in the script language.

15. The control system of claim 12 wherein each of the machine steps is associated with a program for controlling the associated machine to implement the machine step on the associated machine.

16. The control system of claim 12 wherein at least one given machine step is associated with additional job steps and wherein, at the storage means, transmits the additional job steps to other ACUs when the given machine step is matched with a job step.

17. The control system of claim 12 wherein the ACUs communicate using both connected and unconnected messages.

18. The control system of claim 14 wherein the operation parameters of the machine steps are described as a range and wherein;

the storage means further identifies job steps in the script language that directly match the operation of the machine steps in the script language and which have operation parameters within the range of the operation parameters of the machine steps.

19. The control system of claim 16 further including:

(d) ACU transmitting means for a given ACU further transmitting from the given ACU to other ACUs the job description with the matching job step removed and the addition job steps added, when at least one job step matches a machine step associated with additional job steps.

20. The control system of claim 17 wherein the ACUs select between communication on connected or unconnected messages based on historical patterns of communication between the ACUs.

* * * * *